United States Patent [19]

Chen

[11] Patent Number: 5,454,579
[45] Date of Patent: Oct. 3, 1995

[54] FOOT-PROPELLED VEHICLE

[76] Inventor: Chin-yih Chen, 48, the Fu-shing 6th Street, Keng-you Tsun, Wu-feng Hsiang, Taichung, Taiwan

[21] Appl. No.: 291,526

[22] Filed: Aug. 16, 1994

[51] Int. Cl.[6] .............................. B62H 1/12; B62K 1/00
[52] U.S. Cl. ...................... 280/205; 280/226.1; 280/293
[58] Field of Search ................................ 280/220, 205, 280/219, 221, 226.1, 229, 270, 293, 298, 304

[56]  References Cited

U.S. PATENT DOCUMENTS

| 524,019 | 8/1894 | Desmond | 280/270 |
|---|---|---|---|
| 1,537,729 | 5/1925 | Banks | 280/229 |
| 2,950,127 | 8/1960 | Phillips | 280/304 |
| 3,437,351 | 4/1969 | St. Clair Newbern | 280/293 |
| 3,857,584 | 12/1974 | Nohava et al. | 280/293 |
| 4,746,132 | 5/1988 | Eagan | 280/226.1 X |

FOREIGN PATENT DOCUMENTS

| 0341625 | 12/1919 | Germany | 280/220 |
|---|---|---|---|

*Primary Examiner*—Mitchell J. Hill
*Assistant Examiner*—F. Zeender
*Attorney, Agent, or Firm*—Beveridge, DeGrandi, Weilacher & Young

[57] ABSTRACT

A foot-propelled vehicle includes an auxiliary wheel unit and a unicycle suspended on the auxiliary wheel unit, wherein the wheel of the unicycle is suspended from a spring so that when the pedals of the unicycle are forced downward and propelled, the wheel of the unicycle is turned on the ground causing the vehicle to move. When the pedals are released from the pressure, the spring immediately pulls the wheel of the unicycle upwards from the ground.

13 Claims, 3 Drawing Sheets

FOOT-PROPELLED VEHICLE

BACKGROUND OF THE INVENTION

The present invention relates to a foot-propelled vehicle which comprises a unicycle supported on an auxiliary wheel unit and having the wheel suspended from the ground.

A unicycle is generally comprised of a seat frame, a saddle supported on the seat frame at the top, and a wheel frame fastened to the seat frame at the bottom to hold a wheel. When the wheel is propelled by pedals, the unicycle is moved forward or backward. This structure of unicycle is well known and can no longer attract people to ride.

SUMMARY OF THE INVENTION

The present invention provides a foot-propelled vehicle which attracts people to ride. According to the preferred embodiment of the present invention, the foot-propelled vehicle comprises an auxiliary wheel unit and a unicycle suspended on the auxiliary wheel unit. The wheel of the unicycle is suspended from a spring received inside the seat tube. Therefore, when the pedals of the unicycle are forced downward and propelled, the wheel of the unicycle is turned on the ground causing the vehicle to move. When the pedals are released from the pressure, the spring immediately pulls the wheel of the unicycle upwards from the ground. The wheel of the unicycle can also be used as a brake to stop the vehicle from moving when it is directly forced downward against the ground without being propelled.

BRIEF DESCRIPTION OF THE DRAWINGS

The present invention will now be described by way of example with reference to the annexed drawings, in which.

DETAILED DESCRIPTION OF THE PREFERRED EMBODIMENT

Figure 1:
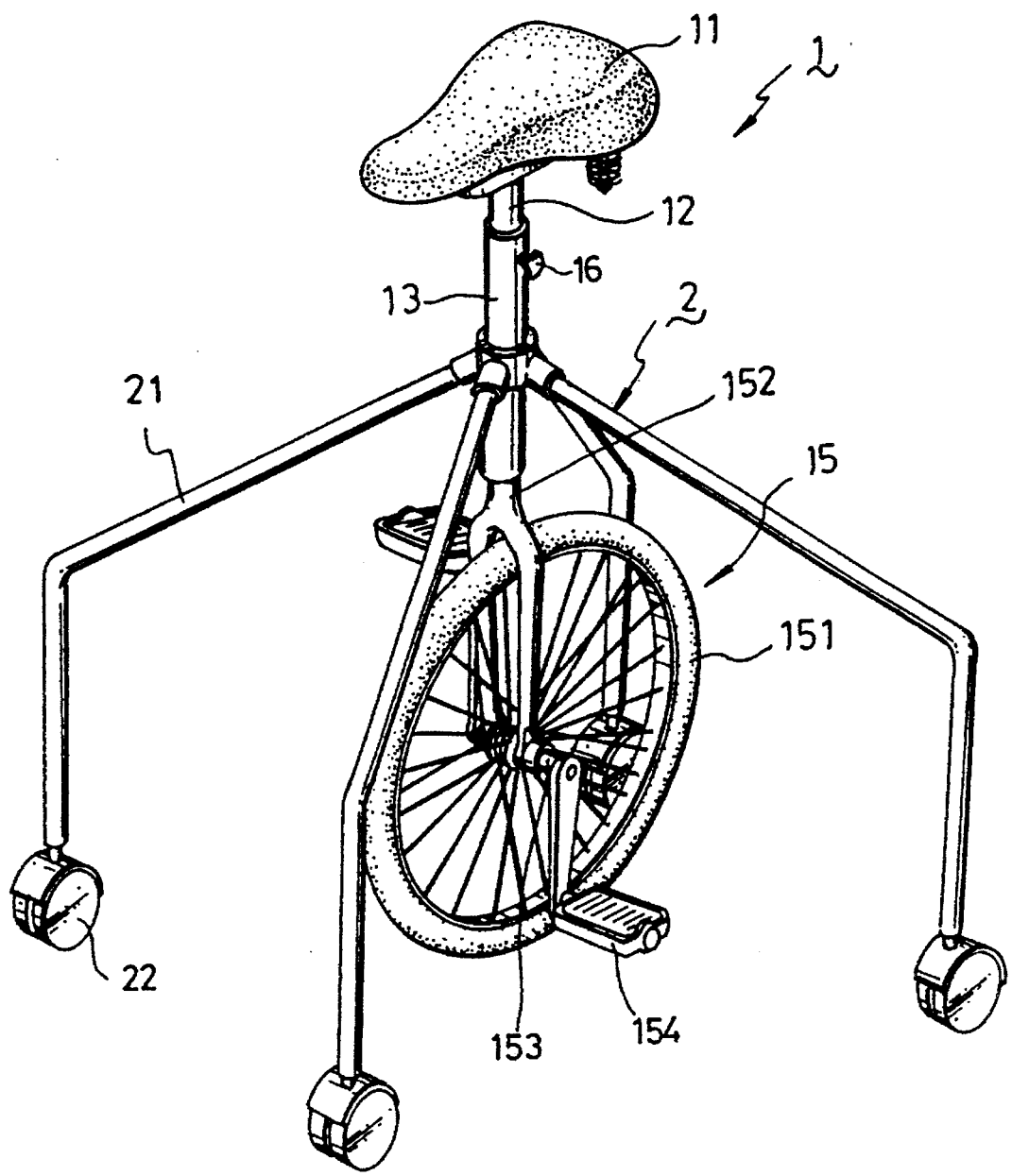
FIG. 1 is an elevational view of a foot-propelled vehicle according to the present invention.
Figure 2:
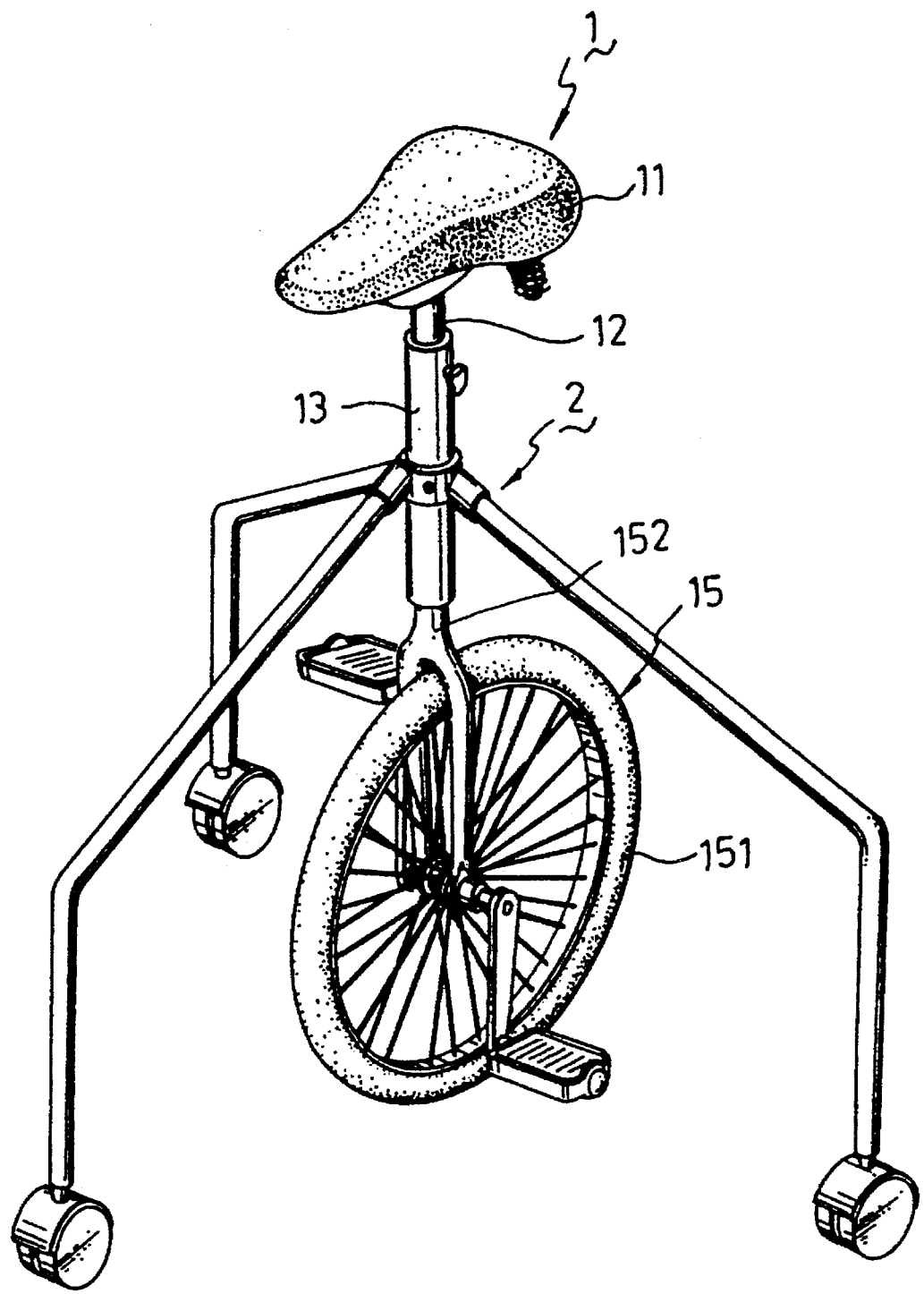
FIG. 2 is similar to FIG. 1 but showing a different auxiliary wheel unit arrangement.

Referring to FIGS. 1 and 2, a foot-propelled vehicle in accordance with the present invention is generally comprised of a unicycle 1 and an auxiliary wheel unit 2. The unicycle 1 is comprised of a saddle 11, a seat pillar 12, a seat tube 13, a spring 14, and a wheel assembly 15, The saddle 11 is mounted on the seat pillar 12 at the top. By specially designed dimensions in production, the seat pillar 12 is inserted into the seat tube 13 from the top and adjustably locked at the desired elevation by a lock screw 16. By the adjustment of the seat pillar 12 relative to the seat tube 13, it is to change for the desired elevation of the saddle 11 and of the wheel assembly 15. The spring 14 is received inside the seat tube 13 having one end fixed to the seat pillar 12. The wheel assembly 15 is comprised of a wheel 151 having a wheel axle 153, a fork 152, and a pair of pedals 154. The fork 152 is inserted into the seat tube 13 from the bottom and connected to an opposite end of the spring 14. The fork tips are supported on the two opposite ends of the wheel axle 153 of the wheel 151. Therefore, the wheel assembly 15 is suspended from the spring 14. The auxiliary wheel unit 2 comprises a plurality of curved supporting frames 21 respectively mounted around the seat tube 13, and a plurality of rollers 22 respectively coupled to the curved supporting frames 21 at the bottom.

Figure 3:
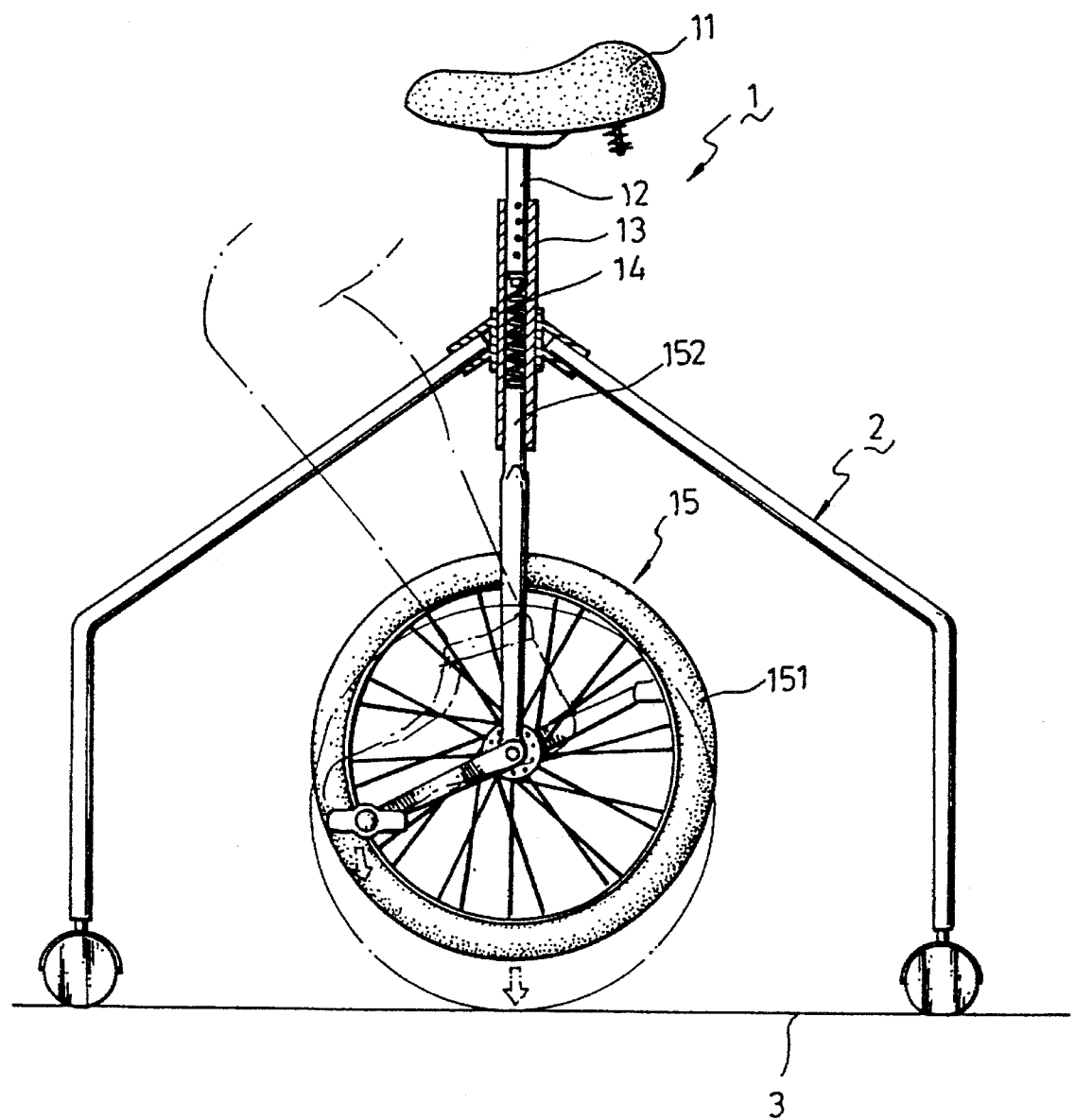
FIG. 3 shows the foot-propelled vehicle of FIG. 1 partially in section and while being propelled.

Referring to FIG. 3, when the foot-propelled vehicle is placed on the ground 3, the whole assembly of the vehicle is supported on the ground 3 by the rollers 22, and the wheel 151 is suspended above the ground 3. When the rider propels the pedals 154, the wheel 151 is forced downward against the ground 3, and therefore the foot-propelled vehicle is moved. When the rider stops pedaling, the wheel 151 is immediately pulled upward from the ground 3 by the spring 14, and at the same time the rollers 22 keep rolling on the ground 3 because of the inertia effect. When the rider forces the wheel 151 downward against the ground 3 without pedaling the pedals 154, the rollers 22 are immediately stopped from running.

While only one embodiment of the present invention has been shown and described, it will be understood that various modifications and changes could be made without departing from the spirit and scope of the invention.

What is claimed is:

1. A foot-propelled vehicle comprising:

an auxiliary wheel unit; and a unicycle supported on the auxiliary wheel unit, wherein said unicycle includes:

a wheel;

a seat pillar;

a seat tube which is a hollow tube;

a saddle, wherein a bottom of the saddle is coupled with a top end of said seat pillar and said seat pillar is inserted into an upper part of said seat tube;

a clutch means including a spring, wherein said spring is mounted in said seat tube and a top of the spring is coupled with a bottom end of said seat pillar, wherein the clutch means is provided for making the wheel move between a position wherein the wheel contacts the ground and a position wherein the wheel is raised up from the ground, wherein a downward force on the wheel moves the wheel to the position wherein it contacts the ground, and when the downward force is removed, the wheel is moved upward from the ground by the clutch means such that only the auxiliary wheel unit contacts the ground; and a wheel assembly which includes a fork for supporting the wheel, wherein a top portion of said fork is inserted into said seat tube at a bottom of the seat tube and coupled with a bottom of said spring.

2. The foot-propelled vehicle of claim 1, further including an adapting means and a fastening means, wherein said adapting means is provided to adapt a position of said seat pillar with respect to said seat tube, and said fastening means fastens said seat pillar to said seat tube.

3. The foot-propelled vehicle of claim 1, wherein said auxiliary wheel unit includes a plurality of curved supporting frames mounted around said seat tube, and a plurality of rollers respectively coupled to the curved supporting frames at a bottom thereof.

4. The foot-propelled vehicle of claim 2, wherein the adapting means and the fastening means are used to adjust a distance between the saddle and the ground.

5. The foot-propelled vehicle of claim 4, wherein the adapting means and the fastening means are used to adjust a distance between the wheel assembly and the ground.

6. The foot-propelled vehicle of claim 2, wherein the adapting means and the fastening means are used to adjust a distance between the wheel assembly and the ground.

7. A foot-propelled vehicle, comprising:

an auxiliary wheel unit; and a unicycle supported on the auxiliary wheel unit, wherein the unicycle includes:

a wheel;

a seat tube;

a seat pillar, wherein a first end of the seat pillar is received in a first part of the seat tube;

a saddle, wherein the saddle is coupled to a second end of the seat pillar;

a clutch means including a spring, wherein the spring is mounted in the seat tube and one end of the spring is coupled with the first end of the seat pillar, wherein the clutch means is provided for making the unicycle wheel move between a first position wherein the wheel contacts the ground when a downward force is applied to the wheel, and a second position wherein the wheel is raised up from the ground when no downward force is applied to the wheel; and a wheel assembly which includes a fork, wherein a first end of the fork is received in the seat tube and is coupled with the clutch means.

8. The foot-propelled vehicle of claim 7, further including:

an adapting means for adjusting a position of the seat pillar with respect to the seat tube; and a fastening means for fastening the seat pillar to the seat tube after an adjustment process using the adapting means.

9. The foot-propelled vehicle of claim 8, wherein the adapting means and the fastening means are used to adjust a distance between the saddle and the ground.

10. The foot-propelled vehicle of claim 9, wherein the adapting means and the fastening means are used to adjust a distance between the wheel assembly and the ground.

11. The foot-propelled vehicle of claim 8, wherein the adapting means and the fastening means are used to adjust a distance between the wheel assembly and the ground.

12. The foot-propelled vehicle of claim 7, wherein the auxiliary wheel unit includes a plurality of supporting frames mounted around the seat tube, wherein each supporting frame includes a roller coupled to a bottom thereof.

13. The foot-propelled vehicle of claim 12, wherein the supporting frames are curved supporting frames.

* * * * *